April 21, 1953 — L. I. SMITH ET AL — 2,635,515

CUT FILM HOLDER LIGHT TRAP

Filed Oct. 4, 1949

INVENTORS,
Leland I. Smith & Raymond Engle
BY Harold J. LeVesconte
ATTORNEY.

Patented Apr. 21, 1953

2,635,515

UNITED STATES PATENT OFFICE 2,635,515

CUT FILM HOLDER LIGHT TRAP

Leland I. Smith and Raymond Engle, Glendale, Calif.

Application October 4, 1949, Serial No. 119,464

4 Claims. (Cl. 95—67)

This invention relates to the art of photography and particularly to an improved form of holder for cut film embodying a novel light trap or seal construction for the guideway through which the conventional dark slide is inserted or removed.

The present day development of extremely sensitive film has made it necessary to take even more precaution than has been observed heretofore to exclude light from the film containing compartment of holders for cut film, and it is the principal object of this invention to provide a holder for cut film including a light trap means for the dark slide or slides which will bear against the dark slide with a surface contact rather than a line contact and which includes means which engages the edges of the dark slide as well as the side surface thereof.

Another object of the invention is to provide a cut film holder in which the usual felt element forming a part of the light trap is actuated by two sets of spring elements which operate in succession as a dark slide is inserted or removed.

Another object of the invention is to provide a cut film holder in which the movement of the light trap means engaging the side surface of a dark slide relative to a fixed portion of the film holder operates to effect a light seal on the edges of the dark slide.

Still another object of the invention is to provide a cut film holder in which the above desirable objects are realized and which is economical to manufacture and reliable in use.

With the above objects in view, together with such other objects and advantages as may subsequently appear, the invention resides in the parts, and in the construction, combination, and arrangement of parts described, by way of example, in the following specification and illustrated in the accompanying drawings, forming a part of said specification, and in which.

Figure 1:
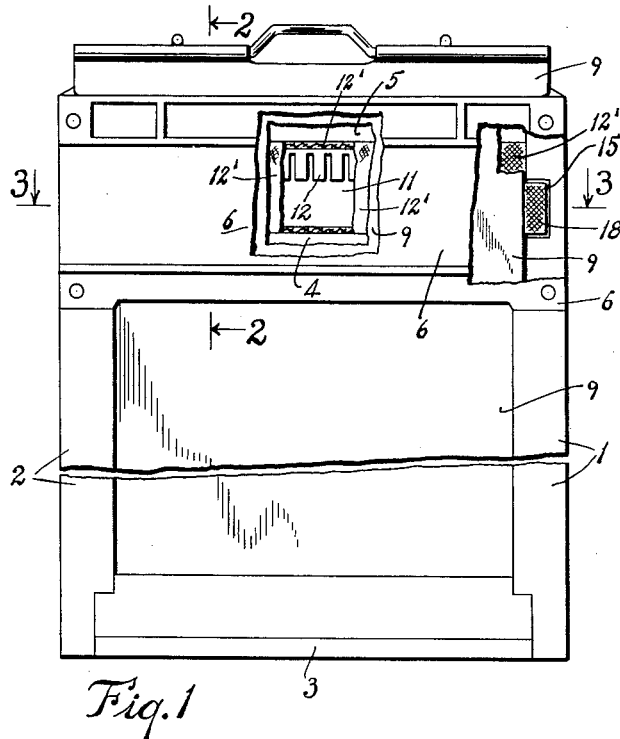
Fig. 1 is a side elevation of a cut film holder embodying the invention; certain portions of the frame and of the parts being broken away for clearness of illustration.

In general, the device is like that disclosed in our co-pending application Serial Number 1,718 filed January 12, 1948, now Patent No. 2,506,907, and comprises a pair of side members 1 and 2 connected at one end by a film inserting gate means 3 and at the opposite end by a light trap supporting member 4 and a top cross member 5. Additionally, at that end the side members are connected by side plates 6 and 7. The side members 1 and 2, the gate means 3 and the light trap support 4 are grooved on their inner faces to engage a backing member 8 in the manner disclosed in our said co-pending application. Additionally, the side members 1 and 2 are grooved to provide guide ways for the conventional dark slides 9 and 10.

The light trap assembly comprises an inverted U-shaped piece of spring metal 11 which engages the upper end of the light trap support 4. Disposed on top of this member 11 is a second inverted U-shaped piece of spring metal 12, of less depth than the member 11, and the sides of which are notched as shown in Fig. 1 to weaken but not destroy the resilience. Overlying the members 11 and 12 is a piece of fabric such as felt 12', the ends of which are wrapped around the edges of the member 11, see Fig. 3. The side plates 6 and 7 are provided with oppositely disposed recesses 13 and 13' into which the felt 12' is moved by the resilience of the member 11 and thus the felt is moved across the guideway 14 for the dark slide 9.

Figure 3:
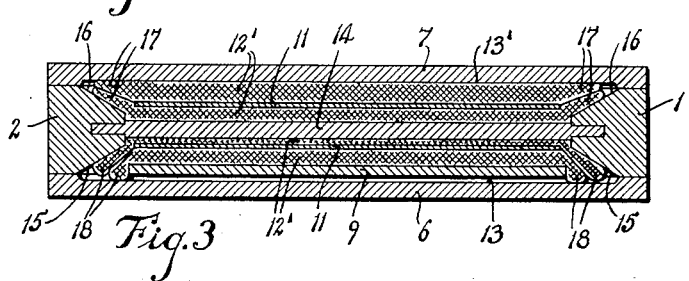
Fig. 3 is a top plan sectional view taken on the line 3—3 of Figs. 1 and 2.
Figure 4:
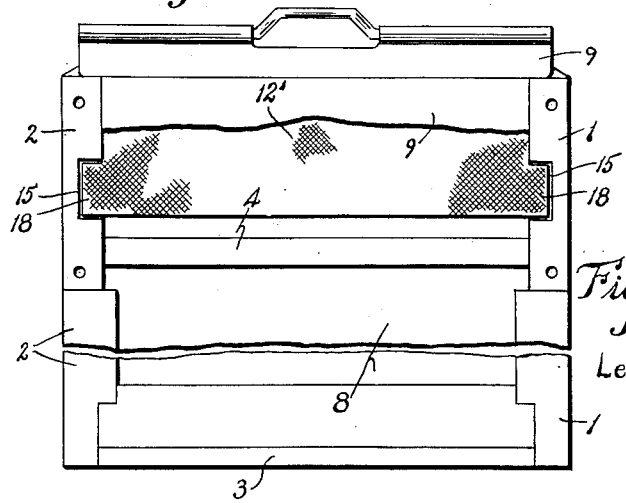
Fig. 4 is a sectional side elevation on the same scale as Fig. 1 but with the cover plate removed.

As shown in Figs. 1 and 3, the side members 1 and 2 opposite the free ends of the light trap members are provided with angularly disposed recesses 15 and 16 into which tabs 17 and 18, formed as a part of the felt covering 12', extend. When a dark slide is inserted in this groove, displacing the light trap member, these tabs are caused to fold themselves around the edge of the dark slide by reason of their engagement with the recesses 15 as best shown in the lower portion of Fig. 3.

Figure 2:
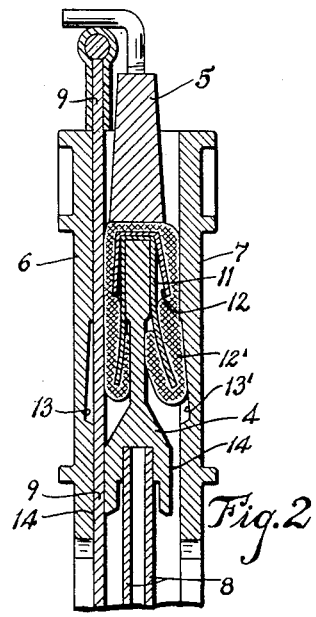
Fig. 2 is an enlarged fragmentary sectional end elevation taken on the line 2—2 of Fig. 1.
Figure 5:
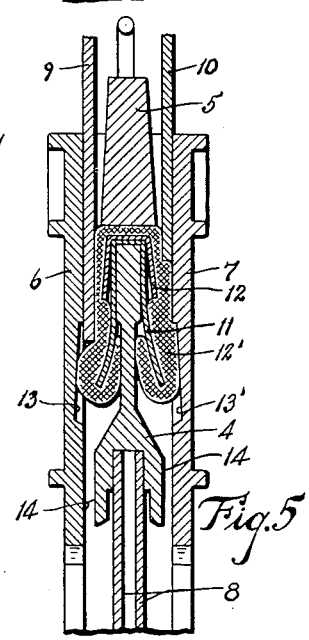
Fig. 5 is a view generally similar to Fig. 2, but showing the progress of a dark slide past the light trap means.

Additionally referring to Figs. 2 and 5, it will be noted that the legs of the member 11 extend parallel and adjacent to the faces of the member 4 over the area thereof disposed beneath the legs of the member 12 with consequent provision of clearance for independent movement of the free ends of the member 12 and hence, as a dark slide is inserted in its guideway and moves into contact with that portion of the felt biased by the member 12, that member will yield but such movement will not affect the extreme end of the felt since that portion of the felt is independently caused to engage the dark slide by the free ends of the member 11. Consequently a good light seal is maintained at the instant of the engagement of the dark slide and the light trap means and it is particularly to be noted as shown at the left hand side of Fig. 5 that as the slide progresses along its guiding groove, the bias of the member 11 effects engagement between the felt 12' and end of the slide and that when the slide is moved past the point of engagement with the light trap means, that means engages the side surface of the slide over a wide area and not in a mere line contact. At the same time, the tabs 17 being held in approximately a plane containing the edges of the side members by the recesses 15 and 16, will not be moved by the action of the member 11 and will tend to wrap themselves around the edges of the dark slide, thus insuring a completion of the light seal.

While we have shown and described one form of our invention, such illustration and description is by way of example only and, therefore, we do not intend to limit ourselves to the exact form thus disclosed but we do declare that the invention embraces all such modifications in the parts, and the construction, combination, and arrangement thereof as shall come within the purview of the appended claims.

We claim:

1. In a holder for cut film, a frame having a film holding compartment formed therein, a dark slide guideway in said frame, a dark slide insertable and removable from said guideway through a slot in said frame, light trap devices disposed in said guideway comprising a fabric strip attached to said frame within said guideway and adjacent to said slot and extending along one side of said guideway toward the film compartment; said strip having one face thereof positioned for engagement by the side of the dark slide adjacent to said compartment, and a pair of independently yieldable, free ended, resilient elements mounted on said frame inwardly of the point of attachment of said fabric strip and disposed in said guideway with the free ends thereof engaging the opposite face of said fabric strip along separate lines extending transversely to the direction of movement of said slide and effective to urge said fabric into yielding engagement with said dark slide when it is inserted in said guideway and to move said fabric strip to close said guideway when the dark slide is removed therefrom.

2. In a holder for cut film, a frame having a film holding compartment formed therein, a dark slide guideway in said frame, a dark slide insertable and removable from said guideway through a slot in said frame, light trap devices disposed in said guideway comprising a fabric strip attached to said frame within said guideway and adjacent said slot and extending along said guideway toward the film compartment; said strip having one face thereof positioned for engagement by the side of said dark slide adjacent said compartment, and a pair of free ended, resilient elements mounted on said frame inwardly of the point of attachment of said fabric strip and disposed in said guideway with the free ends thereof engaging the opposite face of said strip fabric along separate parallel lines extending transversely to the direction of movement of said slide and operative to urge said fabric strip into yielding engagement with said dark slide over a rectangular area thereof when the dark slide is inserted in the guideway and to move said fabric strip to close said guideway against light transmission when the dark slide is removed from the guideway; said fabric strip including a pair of tongue portions extending laterally beyond said dark slide, one at each side edge thereof, and said frame having a tongue receiving recess for each of said tongue portions; said recesses each having a camming face portion operative upon lateral displacement of said fabric strip by insertion of a dark slide in said slot to cause said tongue portions to engage the side edges of the dark slide.

3. A light trap means for the dark slide receiving guideway of a cut film holder frame; said means comprising a first free ended resilient member attached to said frame within the guideway and having the free end thereof extending from the point of attachment to said frame first parallel to the length of said slot and thence generally diagonally both toward the film compartment of the holder and toward the side of the slot opposite the side to which it is attached, a second free ended resilient member also attached to said frame within the slot; said second member overlying said parallel portion of said first member and extending generally diagonally both toward the film compartment and toward the side of the guideway opposite its point of attachment to said frame; and a fabric strip attached to the frame within the guideway at a point between the outer end of said guideway and the points of attachment of said resilient members; said strip overlying the free ends of said resilient members and bridging the space therebetween; the face of said strip opposite the face thereof engaged by said resilient members being positioned to yieldingly engage both the end of a dark slide and the face thereof adjacent the film compartment as the dark slide is moved through the guideway incident to removal or insertion and to engage the opposite side of the guideway with resultant closing of the guideway against light admission when the slide is removed.

4. In a cut film holder having a frame, a film holding compartment, and a dark slide receiving guideway, the combination of light trap means disposed in said guideway comprising a pair of free ended resilient members having one end thereof attached to the frame at the side of said guideway engaged by the face of the dark slide adjacent the film compartment; the free ends of said members being spaced from each other in the direction of movement of the slide in said guideway, and a fabric strip attached to said frame within said guideway at a point between the outer end of said guideway and the points of attachment of said resilient members and interposed between said side of said dark slide and the free ends of said resilient members; the face of said strip opposite the face thereof engaged by said resilient members being positioned to yieldingly engage both the end of the dark slide and said face thereof incident to insertion or removal thereof from said guideway and to cause said fabric strip to engage the opposite face of the guideway when the dark slide is removed therefrom with resultant closure of said guideway against light transmission at all times; said fabric strip at each side edge thereof additionally having laterally extending tongue portions extending one each beyond the opposite side edges of the dark slide, and said frame having complementary tongue receiving recesses each having an inclined camming face portion operative upon lateral displacement of said fabric strip incident to insertion of a dark slide in said guideway to effect engagement of said tongue portions with the side edges of the dark slide.

LELAND I. SMITH.
RAYMOND ENGLE.

References Cited in the file of this patent

UNITED STATES PATENTS

| Number | Name | Date |
|---|---|---|
| 925,895 | Goddard | June 22, 1909 |
| 2,056,144 | Roth | Sept. 29, 1936 |
| 2,114,638 | Parker | Apr. 19, 1938 |
| 2,339,658 | Smith | Jan. 18, 1944 |
| 2,344,951 | Smith | Mar. 28, 1944 |
| 2,450,841 | Moore | Oct. 5, 1948 |
| 2,451,638 | Suydam | Oct. 19, 1948 |
| 2,497,270 | Panosian | Feb. 14, 1950 |

FOREIGN PATENTS

| Number | Country | Date |
|---|---|---|
| 595,926 | France | July 27, 1925 |